Aug. 3, 1943.  J. K. JACKSON  2,326,034
ARTICLE GRINDING APPARATUS
Filed Sept. 20, 1941   2 Sheets-Sheet 1
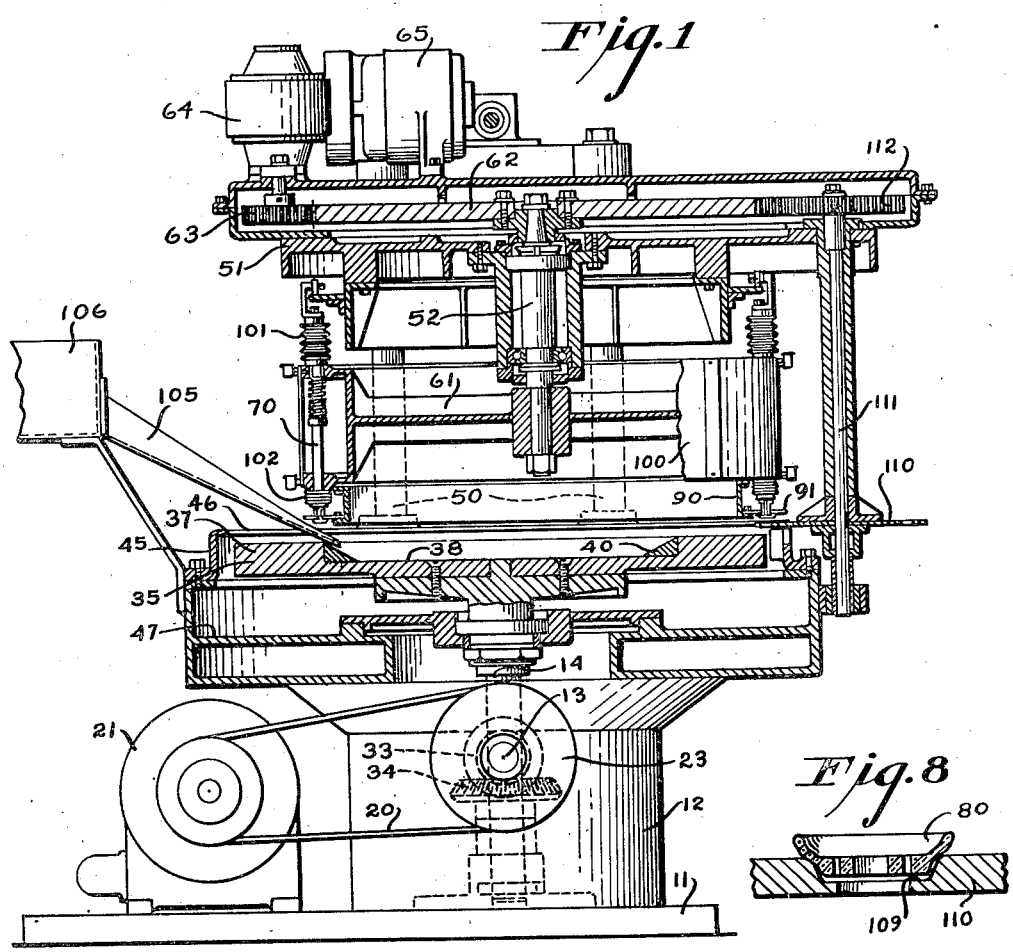
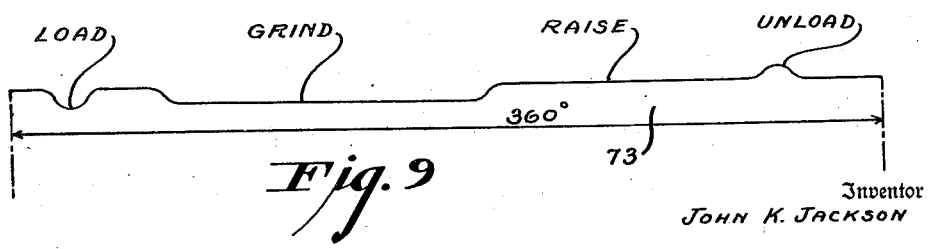
Inventor
JOHN K. JACKSON
By
F. H. Knight
Attorney Aug. 3, 1943.   J. K. JACKSON   2,326,034
ARTICLE GRINDING APPARATUS
Filed Sept. 20, 1941   2 Sheets-Sheet 2
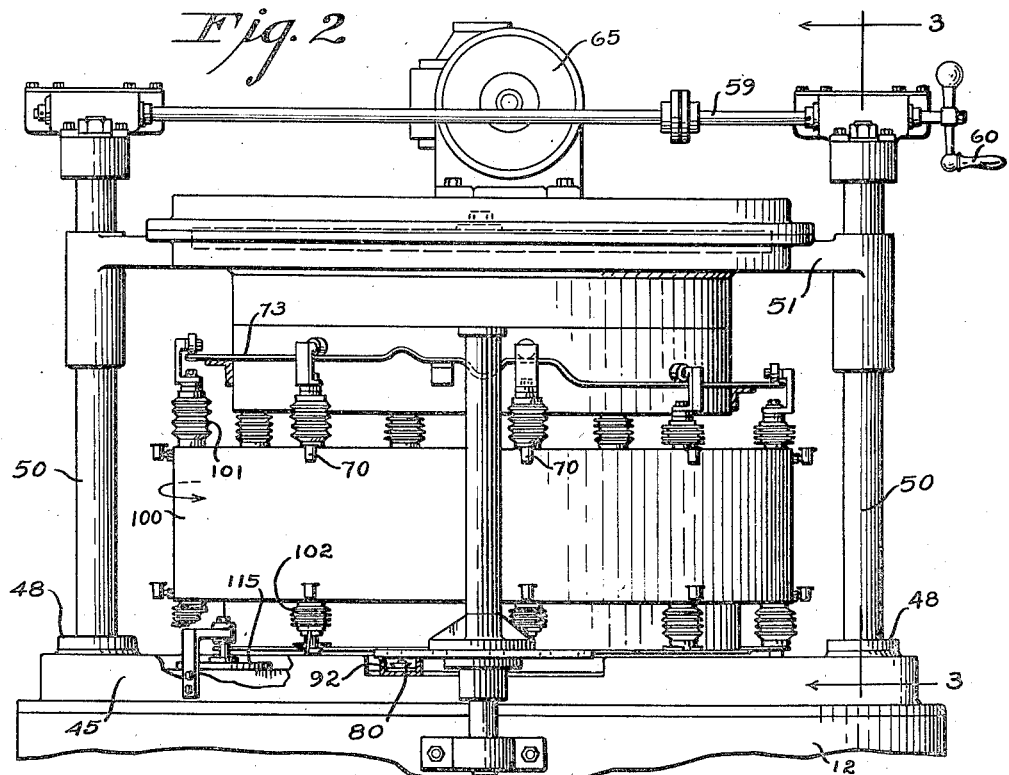
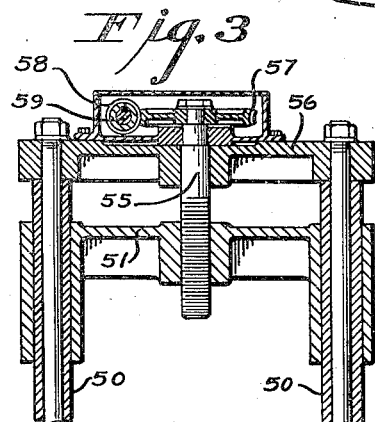
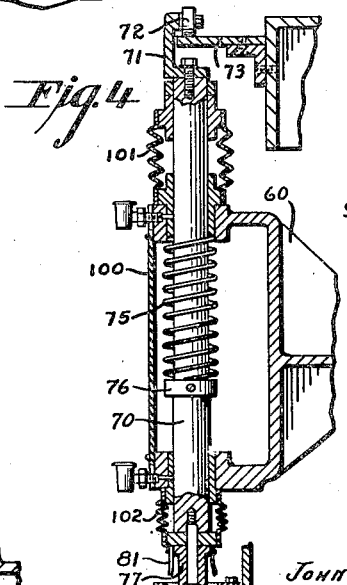
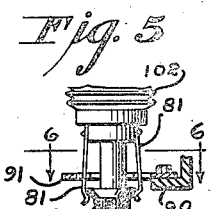
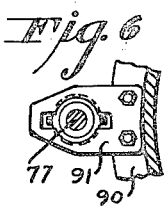
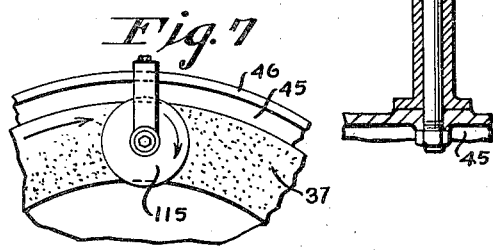
Inventor
JOHN K. JACKSON
By F. H. Knight
Attorney

Patented Aug. 3, 1943

2,326,034

UNITED STATES PATENT OFFICE 2,326,034

ARTICLE GRINDING APPARATUS

John K. Jackson, Corning, N. Y., assignor to Corning Glass Works, Corning, N. Y., a corporation of New York Application September 20, 1941, Serial No. 411,743

6 Claims. (Cl. 51—134)

The present invention relates to grinding apparatus and is particularly concerned with a method of and apparatus suitable for surface grinding large quantities of glass parts or articles.

In the accompanying drawings the invention is embodied in a grinding mechanism equipped with chucks designed to hold radio tube bases to be surfaced ground, although, as will be readily understood, it is well within the scope of this invention to substitute chucks suitable for holding other forms of glass articles to be surface ground.

In the drawings

Fig. 1 is an elevational and in part a sectional view of the grinding mechanism.

Fig. 2 is an enlarged side elevational view of the upper portion of the grinding mechanism.

Fig. 3 is a sectional view of certain parts, taken on line 3—3 of Fig. 2.

Fig. 4 is a sectional view illustrating the detailed structure of one of a plurality of similar work holding units or chuck assemblies of the mechanism and its arrangement of support.

Fig. 5 is a view showing the lower end of a chuck assembly having an article shown in section held therein and also showing an associated article ejecting plate in section.

Fig. 6 is a view on line 6—6 of Fig. 5.

Fig. 7 is an enlarged fragmentary plan illustrating resurfacing apparatus associated with the grinding unit.

Fig. 8 is an enlarged fragmentary section of an article feeding disc with an associated article also shown in section; and Fig. 9 is a straight line diagram of a chuck control and operating cam track.

As depicted in Fig. 1 the mechanism is mounted on a base 11 provided with a sub-base 12 equipped with suitable bearings for accommodating a horizontally disposed drive shaft 13 and a vertically disposed driven shaft 14. The drive shaft 13 is equipped with a drive pulley 23 carrying a drive belt 20 driven by a motor 21. Drive of the vertical shaft 14 is effected by means of a bevel gear 34 mounted on shaft 14 and a bevel pinion 33 mounted on the drive shaft 13. The upper end of shaft 13 has supported thereon a grinding disc 35 having a grinding surface or area 37 surrounding a grinding compound receiving and distributing surface area 38. A filler strip 40 is provided at the junction of surface areas 37 and 38, to facilitate the ready passage of grinding compound from surface area 38 to the grinding surface 37 by centrifugal action, and is composed of plaster of Paris or the like for reasons which will subsequently be explained.

Supported by the portion of base 12 surrounding the disc 35 is a guard ring 45 for preventing grinding compound thrown off the grinding surface 37 from being lost. This guard ring causes the compound to fall into a tray 47 from which it is later recovered. The ring 45 has a flange 46 equipped with pads 48 (Fig. 2) from which four posts 50 project. These posts are arranged in pairs, as illustrated in Figs. 1 and 3, at opposite sides of the apparatus as illustrated in Fig. 2, and serve as guide posts for an equipment frame 51 slidably held in a vertically adjusted position by two similar screws, one of which comprises the screw 55 appearing in Fig. 3. The screw 55 and the similar one (not shown) is mounted in a bridge 56 secured to the tops of posts 50 and each has keyed thereto a worm wheel 57 adapted to be turned by a worm 58 carried by a shaft 59 having a hand crank 60. The equipment support 51 has suspended therefrom an axle 52 arranged parallel but eccentric to the axis of the grinding disc 35 and at the lower end carries a circular article chuck supporting frame 61. The upper end of axle 52 carries a spur gear 62 adapted to be driven by a pinion 63 of a gear reduction unit 64 in turn driven by a motor 65.

The peripheral edge of frame 61 is of channel cross-section and has a plurality of pairs of equally spaced aligned apertures therethrough bushed to receive article chuck supporting shafts 70, as clearly shown in Fig. 4. Each shaft 70 is provided at its top end with a bracket 71 carrying a roller 72 traveling on a cam track 73. A spring 75 surrounds the shaft 70 and is held partly compressed by a collar 76 so that the spring holds roller 72 in engagement with track 73 at all times. The lower end of shaft 70 carries an article chuck assembly comprising a jaw 77 having its bottom end shaped to conform to the shape of the interior of the article 80 intended to be ground on its under surface. The jaw 77 at the upper enlarged end has fastened to it a pair of article retaining springs or jaws 81 the free ends of which are adapted to snap over the edges of an article 80 and hold it to the jaw 77 when the jaw is lowered into such article, as occurs under influence of cam track 73, as will subsequently appear.

Attached to the under side of the peripheral portion of frame 61 is a channel member 90 which at each chuck location carries an article unloading or chuck stripping plate 91 having an aperture through which the chuck jaw 70 can pass and also having suitable enlargements for passage therethrough of the jaws 81. The diameter of the aperture through plate 91 is, on the other hand, smaller than that of the article 80 so that by movement of shaft 70 upward a sufficient distance the article 80 will encounter the plate 91 and be stripped from engagement with jaws 77 and 81. This stripping also occurs under the influence of cam track 73, as will subsequently appear.

A cover plate 100 and bellows 101 and 102 protect the shafts 70 and their surrounding bushings against exposure to grinding compound laden air.

The grinding compound, usually comprising fine emery mixed with water, is supplied by gravity to the surface 38 of disc 35 by a trough 105 projecting from a suitable grinding compound container 106 and is distributed to the grinding surface 37 by centrifugal action.

Arranged on the side of the apparatus opposite trough 105 is an assembly for successively feeding articles to the described article chuck assemblies. The feeding equipment comprises a disc 110 having shallow pockets 109 (Fig. 8) about its peripheral portion into which the articles 80 are placed. The disc 110 is carried by a shaft 111 driven by a gear 112 in mesh with gear 62, and of course the speed of rotation of the disc and spacing of the pockets 109 therein are such that during rotation the articles 80 are successively brought under and in alignment with the article chuck assemblies.

As previously mentioned, the loading as well as the unloading of the articles 80 is effected under control of the cam track 73. Referring now to Fig. 7, the section of cam track 73, designated "Load" is that encountered by a roller 72 just as its chuck assembly and an article 80 carried by disc 110 are being brought into alignment and accordingly the shaft 70 is quickly lowered and raised as required to pick up the article. After a sufficient distance of travel to clear the chuck of the portion of disc 110 overlapping the grinding surface 37 the part of track 73 labeled "Grind" is encountered by roller 72 whereupon the shaft 70 lowers the article 80 into engagement with the grinding surface 37. The section of cam track 73 labeled "Grind" and on which roller 72 travels is high enough at the end first encountered by roller 72 to barely allow an article 80 of maximum thickness tolerance to contact the grinding surface. Also, the speed of grind is such that spring 75 is enabled to hold roller 72 in engagement with track 73 throughout the grinding cycle. This is important in that unless the roller 72 is so held non-uniform wearing of the grinding surface will quickly render it unsuitable for further use. The required grinding is completed after approximately 100° of rotation of frame 61, when the cam track section designated "Raise" is encountered and the article 80 lifted from engagement with the grinding surface 37. Subsequently the sharply raised short section of track designated "Unload" is encountered which momentarily forces the shaft 70 upward high enough to cause the article 80 to be stripped from the chuck assembly by its associated stripping plate 91, causing the article to drop in a trough 92 from which the article is delivered to a conveyor belt or the like (not shown).

Several features of construction which have not been brought out in the foregoing, but which nevertheless contribute materially to the successful operation of the apparatus, will now be discussed.

The extent of eccentricity of the grinding disc 35 relative to the axis of the chuck carrying frame 61 is such that the article surface contacts both lateral limits of the grinding surface 37, and the speed of rotation of the disc 35 is such that the path of progress transverse of such surface is such that the tendency for it to become irregular and grooved is reduced to a minimum, the wear taking place relatively evenly through its surface area.

By employment of the ring 40 of soft material the same is progressively worn away with the wearing away of the grinding surface 46 so that in spite of the wearing down of surface 46 the character of the path for the supply and distribution of grinding compound remains substantially the same throughout the useful life of disc 35.

Although the top surface of the cam track portion labeled "Grind" in Fig. 7 appears perfectly level, as a matter of fact its level declines from the point of commencement of the grinding cycle to the end of such cycle a distance corresponding to the amount of material to be removed from the article. It will be understood of course that the rate of grind is amply fast to prevent the grinding surface 37 from lifting the roller 72 off the cam surface during the grinding cycle.

To prevent the development of any slight irregularities which might otherwise be caused by unequal distribution of wear on surface 37 and also to further assist in the even distribution of grinding compound thereover a surfacing disc 115 (Figs. 2 and 7) may optionally be provided. The disc 115 simply rests in engagement with surface 37 and is rotated in the direction indicated by frictional contact with surface 37.

What is claimed is:

1. In a chuck assembly a rigid jaw having associated therewith a resilient jaw, a stripping plate surrounding said jaws, means for moving said jaws to force the one jaw into engagement with an article to effect its seizure between said jaws, and means for moving said jaws relative to said stripping plate to strip the article from said jaws.

2. In a grinding apparatus, an article chuck assembly for holding an article to be ground, said chuck assembly being adapted to seize an article by being brought into engagement therewith, means surrounding said chuck assembly adapted to strip an article therefrom as the chuck assembly is withdrawn from said means, means for moving said chuck assembly, and means for controlling the movement of said chuck assembly as required to effect seizure of an article thereby and for moving said chuck assembly as required to effect stripping of the article therefrom.

3. In an article grinding apparatus, a chuck including a central part adapted to enter a hollow laterally flared article to be picked up, resilient means associated with said part for gripping opposite lateral edges of an article into which said part has been projected, a stripping plate surrounding said part and said resilient means, and means for effecting relative movement between said part and its associated resilient means with respect to said stripping plate in such direction and to such extent as to strip the article therefrom.

4. In a chuck assembly a rigid jaw having associated therewith a resilient jaw, a stripping member, means for moving said jaws to force the one jaw into engagement with an article to effect its seizure between said jaws, and means for moving said jaws relative to said stripping member to strip the article from said jaws.

5. In a grinding apparatus, an article chuck assembly for holding an article to be ground, said chuck assembly being adapted to seize an article by being brought into engagement therewith, means associated with said chuck assembly adapted to strip an article therefrom as the chuck assembly is withdrawn from said means, means for moving said chuck assembly, and means for controlling the movement of said chuck assembly as required to effect seizure of an article thereby and for moving said chuck assembly relative to said means as required to effect stripping of the article therefrom.

6. In an article grinding apparatus, a chuck including a central part adapted to enter a hollow laterally flared article to be picked up, resilient means associated with said part for gripping opposite lateral edges of an article into which said part has been projected, a stripping member associated with said part and said resilient means, and means for effecting relative movement between said part and its associated resilient means with respect to said stripping member in such direction and to such extent as to strip the article therefrom.

JOHN K. JACKSON.